Sept. 29, 1942.　　　J. BUCHHART　　　2,297,457
UNIVERSAL JOINT
Filed July 30, 1940
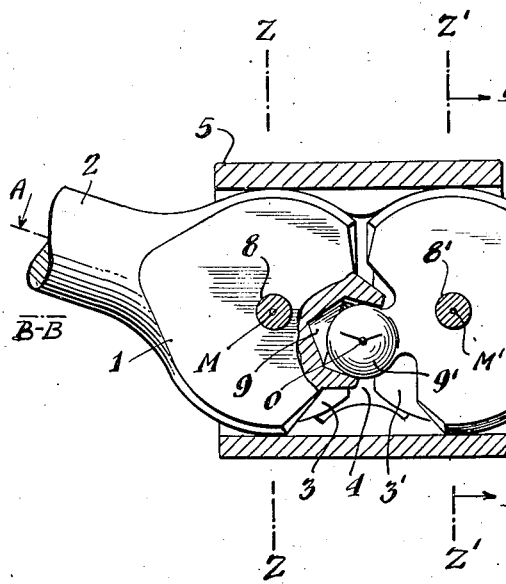
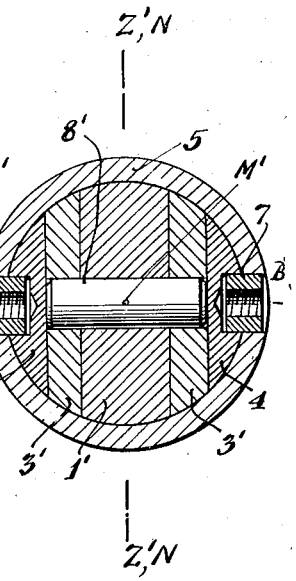
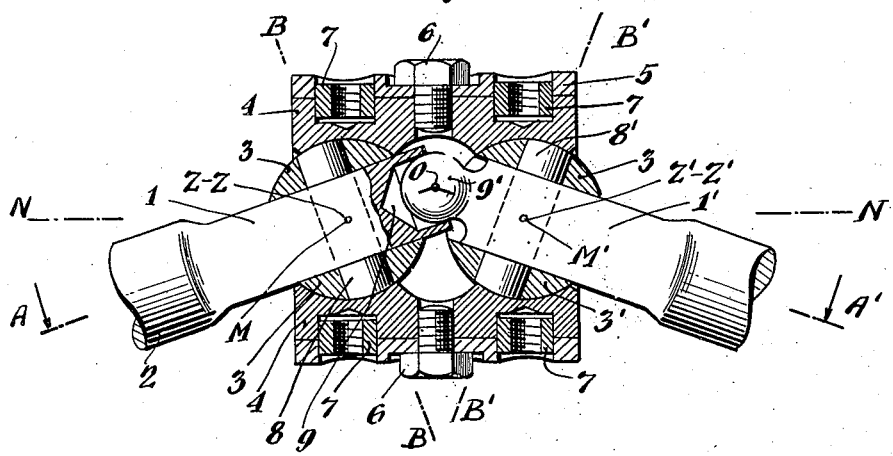
INVENTOR.
JOSEF BUCHHART
BY
ATTORNEYS Patented Sept. 29, 1942

2,297,457

UNITED STATES PATENT OFFICE 2,297,457

UNIVERSAL JOINT

Josef Buchhart, Stuttgart-Zuffenhausen, Germany; vested in the Alien Property Custodian Application July 30, 1940, Serial No. 348,410
In Germany May 25, 1939

1 Claim. (Cl. 64—21)

This invention relates to universal joints, and more particularly to such joints adapted to supply power to the front steerable driving wheels of a vehicle.

An object of this invention is to produce a universal joint permitting a large degree of angular displacement.

Another object of this invention is to provide a universal joint which occupies a relatively small amount of space.

Still another object of this invention is to provide a universal joint which is simple and inexpensive to produce, while at the same time having a rugged and durable construction and permitting the transmission of large amounts of power.

A further object of this invention is to provide a universal joint having relatively large effective surfaces for the transmission of torque.

A more specific object of this invention is to provide a universal joint which, because of its high strength and its low weight is particularly admirably adapted for the drive of independently sprung steerable wheels of a vehicle.

These and other features of the invention will be best understood and appreciated from the following description of a preferred embodiment thereof, described for purposes of illustration and shown in the accompanying drawing in which:

Fig. 1 is a longitudinal cross-sectional view of the universal joint formed in accordance with the present invention;

Fig. 2 is a longitudinal cross-sectional view taken at right angle to Fig. 1; and Fig. 3 is a cross-sectional view along the line III—III of Fig. 1.

As seen in the figures illustrating a preferred embodiment of the present invention, the ends I, I' of the respective shafts 2, 2' to be connected together are flattened parallel to the shaft axes A—O, A'—O, and are spherically curved along the longitudinal sides of the flat portion about the center points M, M' lying upon the shaft axes. The shaft ends I, I' fit into two-part pivot blocks 3, 3 and 3', 3', respectively, shown as having a cylindrical cross-section whose cylinder axes Z—Z, Z'—Z' lie parallel to one another and extend through the points M, M' respectively at right angles to the shaft axes A—O, A'—O. The pivot blocks fit into a central connecting member 4, 4 positioned on opposite sides of a plane N—N extending through the cylinder axes Z—Z, Z'—Z'. The central connecting member 4, 4 is formed with a cylindrical outer surface and strengthened by a surrounding housing 5. Screws 6 and fitted sleeves 7 positively interconnect the housing 5 with the member 4. For the purpose of positively interconnecting the shaft ends I, I' with the respective pivot blocks 3, 3 and 3', 3', there are provided bolts 8, 8' extending through the shaft ends I, I' and into suitable openings in the pivot blocks 3, 3 and 3', 3'. The axes B—B, and B'—B' of the respective bolts 8 and 8' extend perpendicular to the flattened end portions I, I', and to the cylinder axes Z—Z, Z'—Z' of the pivot blocks 3—3 and 3'—3'. The two shafts are furthermore guided relatively to one another by the provision of a cut-out portion 9 in the shaft 2, into which is fitted a spherical head 9' with a center 0, formed as an integral extension on the shaft 2'.

The operation of the universal joint formed in accordance with the present invention will at once be apparent to those skilled in this art. It is to be noted, furthermore, that the joint consists of easily produced pieces so that the production costs are extremely low. While the effective surfaces of the joint are relatively large in order to permit the transmission of a large amount of torque, the joint itself is relatively small and of light weight. Because of such characteristics it is particularly adaptable for use with steerable wheels which are sprung, either independently or otherwise, since it adds very little to the weight of the unsprung masses as compared with other joints now known to the art. The joint formed in accordance with the present invention is not, of course, limited to the use just mentioned, but, broadly speaking, is obviously of general utility.

It will be seen that I have provided a construction which satisfies the objects enumerated above and one which constitutes a valuable advance in the art. While I have shown the invention in a certain physical embodiment it is to be understood that modifications of the structure shown may be made by those skilled in this art without departing from my invention as expressed in the following claim:

A universal joint including a pair of shafts each having an end flattened parallel to its longitudinal axis, one of said shafts having a recess and the other of said shafts having an integral spherical extension fitting into said recess, two split pivot blocks, one surrounding the flattened portion of each shaft end and each having a cylindrical outer surface, the axis of the cylindrical outer surface of each pivot block being parallel to the flattened end of its respective shaft and substantially perpendicular to the shaft axis, a common member for holding said pivot blocks in such a manner that the axes of the cylindrical outer surfaces lie parallel to one another, further means for guiding said shaft ends about an axis perpendicular in one direction to the flattened portion of the shaft and in another direction to the axis of its surrounding cylindrical pivot blocks, and a cylindrical housing surrounding and strengthening said common member, the shaft ends being spherically curved along the longitudinal sides of their flattened portions and enlarged so that the spherically curved surfaces rest against and are guided by said housing.

JOSEF BUCHHART.